United States Patent [19]
Boden et al.

[11] 3,982,870
[45] Sept. 28, 1976

[54] APPARATUS FOR PRODUCING MOLDED FOAM ARTICLES WITHOUT DEFECTS

[75] Inventors: Heinrich Boden, Opladen; Ulrich Knipp, Schildgen-Nittum, both of Germany

[73] Assignee: Bayer Aktiengesellschaft, Leverkusen, Germany

[22] Filed: Mar. 14, 1975

[21] Appl. No.: 558,516

[30] Foreign Application Priority Data
Mar. 20, 1974 Germany............................ 2413357

[52] U.S. Cl................................ 425/252; 425/444; 425/817 R; 264/DIG. 83
[51] Int. Cl.². ........................................ B29D 27/00
[58] Field of Search.............. 425/4 R, 817 R, 252, 425/444, 249, 468; 259/4; 264/DIG. 83, 328, 329

[56] References Cited
UNITED STATES PATENTS

| | | | |
|---|---|---|---|
| 3,174,187 | 3/1965 | Schriever | 425/444 X |
| 3,706,515 | 12/1972 | Keuerleber et al. | 425/252 X |
| 3,793,415 | 2/1974 | Smith | 425/817 R X |
| 3,811,813 | 5/1974 | Taccone | 425/252 |

*Primary Examiner*—Francis S. Husar
*Assistant Examiner*—Mark Rosenbaum
*Attorney, Agent, or Firm*—Joseph C. Gil; Gene Harsh

[57] ABSTRACT

Apparatus to practice the method of forming foam molded articles without the defects caused by incompletely mixed reactants in the mold cavity is provided. A mixing chamber bounded by a sidewall portion having injection apertures, an outlet aperture which communicates with the mold cavity and a first ejector piston displaceable within the bore of the mixing chamber is provided. Opposite said outlet aperture is a second ejector piston which is retracted at the start of the mold filling operation to provide a receiving chamber in the mold wall. As the mold filling proceeds, this piston is displaced towards the mold cavity until its end surface forms a planar surface with the mold wall. Optionally, this piston may be displaced into the mold cavity to eject the molded article.

2 Claims, 3 Drawing Figures

APPARATUS FOR PRODUCING MOLDED FOAM ARTICLES WITHOUT DEFECTS

BACKGROUND OF THE INVENTION

This invention relates to a mixing apparatus for producing multi-component materials, in particular for producing foams based on polyurethane, consisting of storage containers for the components connected to conduits which are equipped with feed pumps and open into a mixing chamber through nozzles or injection openings, a receiving chamber being arranged in line with the outlet aperture of the mixing chamber.

These mixing apparatus are used for filling molding tools with the reaction mixture. Since the mixing apparatus must operate with interruptions due to the filling operations, difficulties arise particularly at the beginning of the mixing process because the components do not mix completely the moment they enter the apparatus. Some portions of the components might, therefore, enter the mold cavity unmixed and cause faults in the finished molded part.

This disadvantage was corrected by providing a receiving chamber opposite the outlet aperture or at a deflecting point of the sprue channel. This receiving chamber was used to catch the first portion of the imperfectly mixed reaction mixture, which was vigorously stirred by the following stream of mixture and then replaced by new mixture because the quantities continuously discharged from the receiving chamber were also introduced into the mold cavity.

This receiving chamber has, however, the disadvantage that the residue of mixture left in it must either be removed by blowing it out before it has completely reacted or the molding tool must be so formed that the contents of the receiving chamber can be released together with the contents of the mold cavity. In either case, the residue of mixture in the receiving chamber is wasted. Furthermore, it has not to date been possible to produce moldings which are free from a sprue seam when a receiving chamber is used.

One object of this invention is to provide a mixing apparatus in which loss of material is prevented in spite of the presence of a receiving chamber. It should preferably be possible to produce moldings without sprue seams.

SUMMARY OF THE INVENTION

According to the invention, this problem is solved by providing a displaceable ejector piston in the receiving chamber.

This ejector piston is withdrawn at the beginning of the mixing process, thereby forming the receiving chamber. Towards the end of the mixing and mold filling operation, the ejector piston is pushed back until the receiving chamber is completely displaced. A perfect mixture can therefore be introduced into the mold cavity even at the beginning of the mixing operation and in addition all loss of material is advantageously avoided. If the mixing chamber is arranged directly inside the molding tool and if the mold cavity extends between the mixing chamber and the receiving chamber, that is to say the receiving chamber is situated opposite the discharge aperture of the mixing chamber, then the ejector piston is advantageously adapted to be pushed back so far at the end of the mixing and mold filling operation that its end surface forms one plane with the wall of the mold cavity. This prevents the formation of any sprue mark.

The ejector piston is preferably driven hydraulically. In the simplest case, it may be hand-operated but it is preferably connected to a control. It goes without saying that the control need not necessarily be hydraulic but may also be mechanical, electric or pneumatic.

The mold filling process may be begun, for example, by actuating the control so that the receiving chamber is formed by withdrawal of the ejector piston. The injection apertures for the components are then released automatically by a time delay relay. After expiration of the time determined by a time relay, the receiving chamber is displaced by the forward movement of the ejector piston and at the same time the inflow of component is stopped. When the molding tool is opened, the ejector piston may be subjected to another control operation so that it acts as ejector for the molded part. Finally, the receiving chamber is again formed by the return movement of the ejector piston.

BRIEF DESCRIPTION OF THE DRAWINGS

The invention is illustrated in the drawing in combination with a molding tool in which the mixing chamber of the mixing apparatus also has an ejector piston which has the added function of a control piston for the inflow of components. In the drawing.

DETAILED DESCRIPTION OF THE INVENTION

Figures 1, 2:
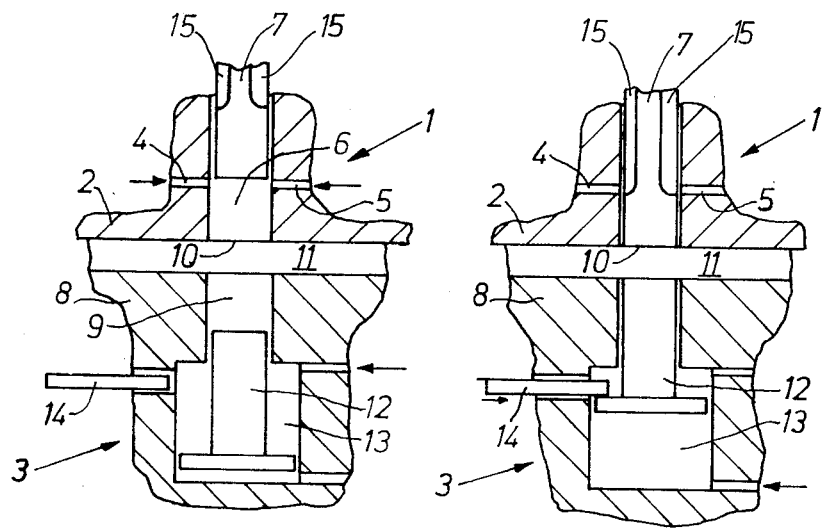
FIG. 1, shows the mixing apparatus with ejector piston in the filling position.
FIG. 2, shows the mixing apparatus with ejector piston after the end of the filling operation.
Figure 3:
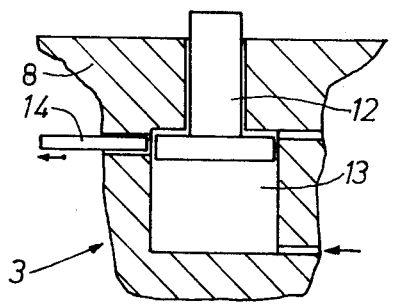
FIG. 3, shows the mixing apparatus with the ejector piston in the position for ejecting the product.

The mixing apparatus indicated by the reference numeral 1 is arranged in the upper box 2 of the molding tool 3. It consists of injection apertures 4, 5 and the mixing chamber 6 in which an ejector and control piston 7 is displaceable. In the lower box 8 of the molding tool 3, a receiving chamber 9 is arranged opposite the outlet aperture 10 of the mixing chamber 6. Between them extends the mold cavity 11. An ejector piston 12 adapted to be driven by the pressure in the hydraulic cylinder 13 is displaceable inside the receiving chamber. A bolt 14 limits the stroke to fix the position of the ejector piston 12 after the filling operation (FIG. 2). In this position, the end surface of the ejector piston 12 forms one plane with the wall of the mold cavity 11. The same applies to the ejector and control piston 7. When the molded part is to be ejected after removal of the upper box 2, the bolt 14 is pulled back so that the ejector piston 12 can move into the position indicated in FIG. 3.

In actual operation the ejector piston 12 is retracted to provide the receiving chamber 9. Then the foam forming reactants are introduced to the mixing chamber 6 by means of the injection apertures 4 and 5. The first injected reactants which may be imperfectly mixed are collected in the receiving chamber 9. The stream of subsequently injected reactants impinging upon this mixture assures its thorough mixture. As the mold filling cycle continues, the ejector piston 12 is moved towards the mold cavity 11 until its end surface is flush with mold wall of the lower box 8. At the end of the mold filling cycle, the ejector and control piston 7 is also moved toward the mold cavity 11 until its end surface is flush with the mold wall of the upper box 2.

This piston is provided with channels 15 which allow the injection apertures 4 and 5 to communicate with recirculation apertures (not shown) when the piston is in this position. After the molded article has had sufficient time to set up the ejector piston 12 is subjected to a further displacement so that it intrudes into the mold cavity 11 and acts to eject the molded article after the cavity is opened.

We claim:

1. In an apparatus for supplying mixed foamable reactants to a mold comprising a mixing chamber bounded by a side wall portion containing injection apertures, a first ejector piston displaceable in the bore of the mixing chamber from a position behind the injection apertures to a position wherein its end surface forms a planar surface with a wall of the mold and an outlet aperture which communicates with the mold cavity, the improvement wherein a second ejector piston is provided in the mold wall opposite said outlet aperture and directly opposite said first piston, said second piston being retractable in a direction away from the mold cavity from a position wherein the end surface of said second piston forms a planar surface with said mold wall to a position wherein a receiving chamber is formed in said mold wall to catch any unmixed reactants.

2. In the apparatus of claim 1 the further improvement wherein the second ejector piston is displaceable so as to intrude into the mold cavity.

* * * * *